(12) United States Patent
Aoi et al.

(10) Patent No.: US 8,586,869 B2
(45) Date of Patent: Nov. 19, 2013

(54) INSULATED WIRE

(75) Inventors: Tsuneo Aoi, Tokyo (JP); Dai Fujiwara, Tokyo (JP); Daisuke Muto, Tokyo (JP); Hiromitsu Asai, Nagoya (JP); Shinji Kouda, Kariya (JP); Fumiaki Abe, Ichihara (JP)

(73) Assignees: Furukawa Electric Co., Ltd., Tokyo (JP); Denso Corporation, Kariya-shi (JP); DIC Corporation, Tokyo (JP)

( * ) Notice: Subject to any disclaimer, the term of this patent is extended or adjusted under 35 U.S.C. 154(b) by 136 days.

(21) Appl. No.: 13/035,694

(22) Filed: Feb. 25, 2011

(65) Prior Publication Data

US 2011/0226508 A1 Sep. 22, 2011

Related U.S. Application Data

(63) Continuation of application No. PCT/JP2009/065009, filed on Aug. 27, 2009.

(30) Foreign Application Priority Data

Aug. 28, 2008 (JP) ................................. 2008-220513

(51) Int. Cl.
*H01B 7/00* (2006.01)

(52) U.S. Cl.
USPC .............. 174/110 R; 174/120 R; 174/120 SR

(58) Field of Classification Search
USPC .......... 174/36, 110 R, 113 R, 120 R, 120 SR, 174/126.1, 126.2
See application file for complete search history.

(56) References Cited

U.S. PATENT DOCUMENTS

| | | | |
|---|---|---|---|
| 4,659,789 A | 4/1987 | Katto et al. | |
| 4,716,079 A | 12/1987 | Sano et al. | |
| 5,281,766 A * | 1/1994 | Hildreth | 174/120 R |
| 5,521,009 A * | 5/1996 | Ishikawa et al. | 428/375 |
| 5,606,152 A * | 2/1997 | Higashiura et al. | 174/120 R |
| 6,207,277 B1 * | 3/2001 | Shieh | 428/375 |
| 6,359,230 B1 * | 3/2002 | Hildreth | 174/110 R |
| 6,638,617 B2 * | 10/2003 | Kim et al. | 428/383 |
| 6,645,623 B2 * | 11/2003 | Dean et al. | 428/379 |
| 7,087,843 B2 * | 8/2006 | Ishii et al. | 174/110 R |
| 2002/0079125 A1 | 6/2002 | Dean et al. | |
| 2004/0105991 A1 | 6/2004 | Ishii et al. | |
| 2008/0128154 A1 | 6/2008 | Faust et al. | |

FOREIGN PATENT DOCUMENTS

| | | | | |
|---|---|---|---|---|
| JP | 59-40409 A | 3/1984 | | |
| JP | 59-113055 A | 6/1984 | | |
| JP | 61-176658 A | 8/1986 | | |
| JP | 61-221552 A | 10/1986 | | |
| JP | 61-269808 A | 11/1986 | | |
| JP | 62-200605 A | 9/1987 | | |
| JP | 63-29412 A | 2/1988 | | |
| JP | 63-195913 A | 8/1988 | | |
| JP | 4-202364 A | 7/1992 | | |
| JP | 4-211712 A | 8/1992 | | |
| JP | 7-31944 B2 | 4/1995 | | |
| JP | 2004-143372 A | 5/2004 | | |
| JP | 2005-203334 A | 7/2005 | | |
| JP | 2005-203334 A | * 7/2005 | ............... | H01B 7/02 |
| JP | 2007-312564 A | 11/2007 | | |
| JP | 2008-163112 A | 7/2008 | | |
| JP | 2008-523544 A | 7/2008 | | |

OTHER PUBLICATIONS

International Search Report, dated Dec. 8, 2009, issued in PCT/JP2009/065009.

Extended European Search Report, dated Mar. 27, 2013, for European Application No. 09810009.2.

* cited by examiner

*Primary Examiner* — William H Mayo, III
(74) *Attorney, Agent, or Firm* — Birch, Stewart, Kolasch & Birch, LLP

(57) ABSTRACT

An inverter surge-resistant insulated wire, having an enamel baked layer, an adhesive layer, and an extrusion-coated resin layer, around the outer periphery of a conductor, wherein the sum of the thickness of the enamel baked layer, the extrusion-coated resin layer, and the adhesive layer is 60 μm or more, wherein the thickness of the enamel baked layer is 50 μm or less, and wherein the extrusion-coated resin layer is formed from a polyphenylene sulfide resin composition, which contains a polyphenylene sulfide polymer having a melt viscosity at 300° C. of 100 Pa·s or more, 2 to 8 mass % of a thermoplastic elastomer, and an antioxidant, and which has a tensile modulus of elasticity at 25° C. of 2,500 MPa or more, and a tensile modulus of elasticity at 250° C. of 10 MPa or more.

20 Claims, No Drawings

INSULATED WIRE

This application is a Continuation of PCT International Application No. PCT/JP2009/065009 filed on Aug. 27, 2009, which claims the benefit of Patent Application No. 2008-220513 filed in Japan, on Aug. 28, 2008. The entire contents of all of the above applications is hereby incorporated by reference.

TECHNICAL FIELD

The present invention relates to an insulated wire, and more specifically, to an inverter surge-resistant insulated wire having its insulating property reinforced, and to an insulated wire intended to omit core insulation.

BACKGROUND ART

Inverters have become installed in many types of electrical equipments, as efficient variable-speed control units. Inverters are switched at a frequency of several kHz to several ten kHz, to cause a surge voltage at every pulse thereof. Inverter surge is a phenomenon in which reflection occurs at a breakpoint of impedance, for example, at a starting end, a termination end, or the like of a connected wire in the propagation system, and consequently, to apply a voltage twice as high as the inverter output voltage at the maximum. In particular, an output pulse occurred due to a high-speed switching device, such as an IGBT, is high in steep voltage rise. Accordingly, even if a connection cable is short, the surge voltage is high, and voltage decay due to the connection cable is also low. As a result, a voltage almost twice as high as the inverter output voltage occurs.

As coils for electrical equipments, such as inverter-related equipments, for example, high-speed switching devices, inverter-driven rotary electric machines, and transformers, use is made of insulated wires, which are mainly enameled wires, as magnet wires in the coils. Further, as described above, since a voltage almost twice as high as the inverter output voltage is applied in inverter-related equipments, it has become required to minimize the inverter surge deterioration of the enameled wire, which is one of the materials constituting the coils of those electrical equipments.

In general, partial discharge deterioration is a phenomenon in which an electrical-insulation material undergoes, in a complicated manner, for example, molecular chain breakage deterioration caused by collision with charged particles that have been generated by partial discharge of the insulating material, sputtering deterioration, thermal fusion or thermal decomposition deterioration caused by local temperature rise, and chemical deterioration caused by ozone generated due to discharge. For this reason, reduction in thickness, for example, is observed in the actual electrical-insulation materials, which have been deteriorated as a result of partial discharge.

It is believed that inverter surge deterioration of an insulated wire also proceeds by the same mechanism as in the case of general partial discharge deterioration. That is, inverter surge deterioration of an enameled wire is a phenomenon in which partial discharge occurs in the insulated wire due to the surge voltage with a high peak value, which is occurred at the inverter, and the coating of the insulated wire causes partial discharge deterioration as a result of the partial discharge; in other words, the inverter surge deterioration of an enameled wire is high-frequency partial discharge deterioration.

The recent electrical equipments require insulated wires, which are capable of withstanding a surge voltage of 500 V. That is, there is a demand for insulated wires that have a partial discharge-occurring voltage of 500 V or more. Herein, the partial discharge-occurring voltage is a value that is measured by a commercially available apparatus called partial discharge tester. Measurement temperature, frequency of the alternating current voltage to be used, measurement sensitivity, and the like are values that may vary as necessary, but the above-mentioned value is an effective value of the voltage at which partial discharge occurs, which is measured at 25° C., 50 Hz, and 10 pC.

When the partial discharge-occurring voltage is measured, a method is used in which the most severe condition possible in the case where the insulated wire is used as a magnet wire is envisaged, and a specimen shape is formed which can be observed in between two closely contacting insulated wires. For example, in the case of an insulated wire having a circular cross-section, two insulated wires are brought into linear contact by spiral twisting the wires together, and a voltage is applied between the two insulated wires. Alternatively, in the case of an insulated wire having a rectangular cross-section, use is made of a method of bringing two insulated wires into planar contact through the planes, which are the long sides of the insulated wires, and applying a voltage between the two insulated wires.

In order to obtain an insulated wire that does not cause partial discharge, that is, having a high partial discharge-occurring voltage, so as to prevent the deterioration of the enamel layer of the insulated wire caused by the partial discharge, it is thought to utilize a method of using a resin low in specific permittivity (dielectric constant) in the enamel layer or increasing the thickness of the enamel layer. However, the resins of commonly used resin varnishes generally have a specific permittivity between 3 and 4, and none of the resins have particularly low specific permittivity. Further, upon considering other properties (heat resistance, solvent resistance, flexibility, and the like) required from the enamel layer, it is not necessarily possible in reality to select a resin low in specific permittivity. Therefore, in order to obtain a high partial discharge-occurring voltage, it is indispensable to increase the thickness of the enamel layer. When the resins having a specific permittivity of 3 to 4 are used in the enamel layer, if it is intended to obtain a targeted partial discharge-occurring voltage of 500 V or higher, it is necessary based on the experience to set the thickness of the enamel layer at 60 μm or more.

However, in order to thicken the enamel layer, the number of passages made through the baking furnace in the production process is increased, the thickness of a coating formed from copper oxide at the surface of copper, which is a conductor, is increased, and thereby the adhesive force between the conductor and the enamel layer is lowered. Particularly, in the case of obtaining an enamel layer with thickness 50 μm or more, the number of passages made through the baking furnace exceeds 10 times. It has been known that if this number of passages exceeds 10 times, the adhesive force between the conductor and the enamel layer is conspicuously lowered.

It is also thought to utilize a method of increasing the thickness that can be formed by a single baking step, in order not to increase the number of passages made through the baking furnace. However, this method has a drawback that the solvent of the varnish is not completely vaporized and remains in the enamel layer as voids.

Attempts have been made hitherto to impart added values in terms of properties (properties other than the partial discharge-occurring voltage) to the enameled wire by providing a resin coating at the outer surface of the enameled wire. For example, Patent Literatures 1 to 3 are mentioned as techniques of the related art in terms of the constitution of providing an extrusion-coated layer on an enamel layer. However, these techniques were not so satisfactory in terms of the constitution of the thickness of the enamel layer or the extruded coating, from the standpoint of balancing between the partial discharge-occurring voltage and the adhesiveness between the conductor and the enamel layer.

Further, it has become demanded to further improve various performances, such as heat resistance, mechanical properties, chemical properties, electrical properties, and reliability, in the electrical equipments developed in recent years, as compared to the conventional electrical equipments. Under the situations, excellent abrasion resistance, thermal aging resistance, and solvent resistance have become required from insulated wires, such as enameled wires, that are used as magnet wires for electrical equipments for aerospace use, electrical equipments for aircraft, electrical equipments for nuclear power, electrical equipments for energy, and electrical equipments for automobiles.

Further, electrical equipments, which are represented by transformers or rotary electric machines, such as motors, have recently advanced in size reduction and performance improvement, and it becomes found that, in many applications, insulated wires to be used are pushed into a quite narrow space to pack. Specifically, it is not an exaggeration to say that the performance of a rotary electric machine depends on how many electrical wires can be placed and packed in a core slot in the rotary electric machine. As a result, the ratio of the cross-sectional area of the conductor to the cross-sectional area of the core slot (packing factor) is significantly increasing in recent years.

When electrical wires each having a circular cross-section are closely packed at the inside of a core slot, the space serving as dead space and the cross-sectional area of the respective insulation coating become important factors. For this reason, users attempt to increase the packing factor as much as possible, by press-fitting more electrical wires into a core slot, as far as the electrical wire having a circular cross-section is deformed. However, since reducing the cross-sectional area of the insulation coating sacrifices electrical performance thereof (insulation breakdown or the like), such reduction has not been carried out.

For the reasons discussed above, it has been lately attempted to use a rectangular wire in which the conductor has a shape similar to a quadrilateral (square or rectangle), as a means for increasing the packing factor. Use of a rectangular wire exhibits a dramatic effect in increasing the packing factor. However, since it is difficult to uniformly apply an insulation coating on a rectangular conductor, and since it is particularly difficult to control the thickness of the insulation coating in an insulated wire having a small cross-sectional area, the use of a rectangular wire is not so widely spread.

Working resistance of a coating is a property of an insulation coating required when coil-winding for a motor rotary electric machine or a transformer. This is because when the coating of an electrical wire is damaged upon the coil working step described above, the electrical insulation performance deteriorates.

Various methods have been conceived as the method of imparting this working resistance to the coating of an electrical wire. Examples thereof include a method of reducing surface damage at the time of working into a coil, by imparting a lubricating property to the coating, and thereby lowering the coefficient of friction; and a method of retaining the electrical insulation performance, by improving the adhesiveness between the coating and the electrical conductor, and thereby preventing the coating from being peeled off from the conductor.

As the former method of imparting lubricating performance, use has been traditionally employed of a method of applying a lubricant, such as wax, on the surface of an electrical wire; or a method of imparting lubricating performance, by adding a lubricant to the insulation coating, and making the lubricant to bleed out to the surface of the electrical wire at the time of producing the electrical wire. There are many examples of the former method. However, since the method of imparting this lubricating performance does not enhance the strength of the coating of the electrical wire itself, the method seems to be effective against the surface damage factors, but there has been in fact limitation on the effect of the method.

First, in regard to the above-mentioned method of reducing the coefficient of friction at the surface of the insulation coating, as a means that has been conventionally used, for example, Patent Literature 4 or the like proposes a method of applying wax, oil, a surfactant, a solid lubricant, or the like on the surface of an insulated wire; Patent Literature 5 or the like proposes a method of applying, to an insulated wire, a friction reducing agent formed from a wax capable of being emulsified in water and a resin capable of being emulsified in water and solidifying when heated, and baking the insulated wire before use; and Patent Literature 6 or the like proposes a method of inducing lubrication by adding a fine powder of polyethylene to the insulation coating material itself. The above methods have been conceived so as to enhance the surface lubricating property of the insulated wire, and to consequently protect the insulation layer from surface damage through surface sliding of an electrical wire.

However, since these methods of adding a fine powder are complicated in the technique of adding the fine powder, and dispersing is difficult, a method of adding such a fine powder in the form of being dispersed in a solvent, into an insulation coating material, is employed in many cases.

These self-lubricating components can have an improvement of the self-lubricating performance (coefficient of friction) by the lubricating components, but do not have an improvement of properties, such as reciprocating abrasion caused by working resistance. Furthermore, many types of self-lubricating components, such as polyethylene and poly (tetrafluoroethylene), become separated off in the insulation coating material, due to the difference in the specific gravity between the insulation coating material and the self-lubricating components, it is necessary to pay careful attention upon using these coating materials.

As a means for solving these problems, a means described in Patent Literature 7 is proposed, and inventions of the following respective constitution are described as the means.

(1) An insulated wire, having at least one enamel baked layer around the outer periphery of a conductor, and at least one extrusion-coated resin layer on the outer side thereof, wherein the sum of the thickness of the enamel baked layer and the extrusion-coated resin layer is 60 μm or more;

(2) The insulated wire described in item (1), wherein the thickness of the enamel baked layer is 50 μm or less;

(3) The insulated wire described in item (1) or (2), wherein the extrusion-coated resin layer is formed from a resin material having a tensile modulus of elasticity at 25° C. of 1,000 MPa or more and a tensile modulus of elasticity at 250° C. of 10 MPa or more;

(4) The insulated wire described in any one of items (1) to (3), having the at least one enamel baked layer around the outer periphery of the conductor having a rectangular cross-section, and the at least one extrusion-coated resin layer on the outer side thereof, wherein the thickness of the extrusion-coated resin layer provided on one pair of two sides facing each other of the cross-section is different from the thickness of the extrusion-coated resin layer provided on the other pair of two sides facing each other;

(5) The insulated wire described in any one of items (1) to (4), having an adhesive layer between the enamel baked layer and the extrusion-coated resin layer, wherein the adhesive force between the enamel baked layer and the extrusion-coated resin layer is reinforced, by using the adhesive layer as a medium; and (6) A method of producing the insulated wire described in item (5), comprising: baking a varnished resin, around the outer periphery of the enamel baked layer, to form the adhesive layer; and then, bringing the adhesive layer into contact with the extrusion-coated resin, which is in a molten state at a temperature higher than the glass transition temperature of the varnished resin, thereby to cause thermal fusion of the enamel layer and the extrusion-coated resin layer.

Patent Literature 7 describes the following matters, as objects of their invention. The above invention is intended to provide an insulated wire high in partial discharge-occurring voltage. The above invention is also intended to provide an insulated wire that can realize thickening of the insulating layer for increasing the partial discharge-occurring voltage, without lowering the adhesive strength between the enamel layer and the conductor of the insulated wire. Further, the above invention is also intended to provide an insulated wire which satisfies the requirements of abrasion resistance, thermal-aging resistance, and solvent resistance, which are required from an insulated wire. The above invention is also intended to provide an insulated wire capable of having an increased packing factor, without lowering the partial discharge-occurring voltage. Moreover, the above invention is also intended to provide an insulated wire having satisfactory insertability at the time of working into a coil of a rotary electric machine, such as a motor. The above invention is also intended to provide an insulated wire capable of preventing a lowering in the partial discharge-occurring voltage at a bent portion even in the case of performing bending at a small radius, and to provide a method of producing the insulated wire.

The following are mentioned in Patent Literature 7, as the effects of their invention.

That is, the insulated wire of the above invention satisfies both of the "partial discharge-occurring voltage" and the "adhesive strength between the conductor and the enamel layer," and suppresses the occurrence of inverter surge deterioration.

Further, when the thickness of the enamel layer is set at 50 μm or less, the number of passages made through the baking furnace can be reduced, and thus the adhesive force between the conductor and the enamel layer can be prevented from being extremely lowered.

Furthermore, when the extrusion-coated resin layer is formed from a resin material having a tensile modulus of elasticity at 25° C. of 1,000 MPa or more and having a tensile modulus of elasticity at 250° C. of 10 MPa or more, the insulated wire is also excellent in abrasion resistance, thermal-aging resistance, and solvent resistance.

Furthermore, in the case of an insulated wire with a conductor having a rectangular cross-section, when the thickness of the extrusion-coated resin layer formed on one pair of planes where discharge occurs is within a predetermined thickness, the partial discharge-occurring voltage can be maintained even if the thickness of the extrusion-coated resin layer formed on the other pair of planes facing each other is smaller than the predetermined thickness, and further the packing factor can be increased.

The insulated wire of the above invention has a small coefficient of static friction, and has favorable insertability in the case of being worked into a coil of a rotary electric machine.

Moreover, when the adhesive strength is enhanced by introducing a layer having an adhesive function between the enamel layer and the extrusion-coated resin layer, occurrence of wrinkles such as described above can be prevented.

In addition, the insulated wire of the above invention can be favorably produced, by baking a varnished resin around the outer periphery of the enamel baked layer, to form an adhesive layer, and then bringing the adhesive layer into contact with the extrusion-coated resin which is in a molten state at a temperature higher than the glass-transition temperature of the resin utilized in the adhesive layer, and thereby thermally fusing the enamel baked layer with the extrusion-coated resin layer.

However, the following new technical problems have been raised in recent years.

(i) Insulation Performance Maintainability at Worked Portion (Working Resistance)

When a magnet wire is worked into a rotary electric machine, such as a motor, various stresses are applied. Above all, in a step referred to as bending, the bending of a wire is conducted, using a front jig as a fulcrum. In particular, in the case of wires having conductors with large diameters, or in the case of wires having insulation coatings with large thickness, each of which are increasingly used in recent years, stress is increased as much, and the force applied to the front jig and the fulcrum for pressing to the wire is also increased. In this case, at the portion of the wire contacting with the front jig, a compression mark remains on the insulation coating of the wire, and the thickness of the insulation layer is locally decreased. On the outer side of the bent portion R, the coating is stretched so that the insulation thickness is decreased. As a result, there is a problem that the electrical insulation property is lowered at these portions.

(ii) Coating Shape Maintainability at Worked Portion (Working Resistance)

After the bending of the wire such as described above, the strain exerted to the insulation coating of the wire at the time of the bending, is not negligible. In particular, in recent years, there are problems that the form of working provided on the wire is becoming more severe for the reason of size reduction and efficiency increasing of rotary electric machines; and that the strain is increased, which is locally applied on the insulation coating, for example, in a wire with a conductor having a large diameter or a wire with an insulation coating having a large thickness such as described above, which may cause breakage of the insulation coating after the working. In particular, after a heat cycle is performed after the working, the superiority or inferiority thereof appears significantly.

(iii) Insulation Performance Maintainability after Thermal Aging (Heat Resistance)

In various fields where rotary electric machines are used, there are many instances, for example, in which the voltage to be applied becomes higher due to an increase in the efficiency of the rotary electric machine, or in which the heat emission property cannot be sufficiently secured due to size reduction. Recently, the demand for the heat resistance of a rotary electric machine, that is, similarly the demand for the heat resistance of a magnet wire, is also rising. In particular, even after a coating is instantaneously and intermittently exposed to a high temperature above the designed temperature, a sufficient insulation performance is required of the coating.

It has become known that further studies are necessary against those technical problems, in addition to the countermeasures proposed in Patent Literature 7.

Patent Literature 1: JP-A-59-040409 ("JP-A" means unexamined published Japanese patent application)
Patent Literature 2: Japanese Patent No. 1998680 (JP-B-7-031944 ("JP-B" means examined Japanese patent publication))
Patent Literature 3: JP-A-63-195913
Patent Literature 4: JP-A-61-269808
Patent Literature 5: JP-A-62-200605
Patent Literature 6: JP-A-63-29412
Patent Literature 7: JP-A-2005-203334

SUMMARY OF INVENTION

Technical Problem

The present invention is contemplated for providing an insulated wire, which has a high partial discharge-occurring voltage, and which is excellent in solvent resistance and abrasion resistance of the coating, insulation performance maintainability of the worked portion, coating shape maintainability of the worked portion, and insulation performance maintainability after thermal aging.

Further, the present invention is also contemplated for providing a method of producing a motor, which reduces occurrence of strain against the insulation coating of a wire at the time of assembling of the motor accompanied by deformation working of the wire.

Solution to Problem

According to the present invention, there is provided the following means:
(1) An inverter surge-resistant insulated wire, having at least one enamel baked layer around the outer periphery of a conductor, and at least one extrusion-coated resin layer on the outer side thereof, and having an adhesive layer between the enamel baked layer and the extrusion-coated resin layer, thereby the wire is reinforced in adhesive force between the enamel baked layer and the extrusion-coated resin layer, with the adhesive layer as a medium,
wherein the sum of the thickness of the enamel baked layer, the extrusion-coated resin layer, and the adhesive layer is 60 µm or more,
wherein the thickness of the enamel baked layer is 50 µm or less, and
wherein the extrusion-coated resin layer is formed from a polyphenylene sulfide resin composition, which contains a polyphenylene sulfide (hereinafter, also referred to as "PPS") polymer having a melt viscosity at 300° C. of 100 Pa·s or more, 2 to 8 mass % of a thermoplastic elastomer, and an antioxidant, and which has a tensile modulus of elasticity at 25° C. of 2,500 MPa or more, and a tensile modulus of elasticity at 250° C. of 10 MPa or more;
(2) The inverter surge-resistant insulated wire according to item (1), wherein the polyphenylene sulfide resin composition has a tensile elongation at break at 25° C. of 15% or more, and a tensile elongation at break at 25° C. after exposed to the air at 200° C. for 100 hours, of 5% or more;
(3) The inverter surge-resistant insulated wire according to item (1) or (2), wherein the polyphenylene sulfide polymer has a non-Newtonian index of 1.1 or less; and
(4) A method of producing a rotary electric machine, comprising the steps of:
assembling an armature of a rotary electric machine, accompanied by deformation working of the insulated wire of item (1) in a state where the polyphenylene sulfide resin composition of the extrusion-coated resin layer is not crystallized; and
heating the assembled insulated wire, to a temperature of 120° C. or higher, to cause crystallization of the polyphenylene sulfide resin of the insulated wire.

Advantageous Effects of Invention

The inverter surge-resistant insulated wire of the present invention can be a wire, which has a high partial discharge-occurring voltage, and which is excellent in solvent resistance and abrasion resistance of the coating, insulation performance maintainability at the worked portion, coating shape maintainability of the worked portion, and insulating property maintainability after thermal aging.

The method of producing a motor of the present invention can reduce stress exerted to the insulation coating of the wire at the time of forming of the wire, and improve, for example, thermal, mechanical, and chemical performances of the coating, by crystallizing the PPS resin composition after the assembling and working of the wire.

Other and further features and advantages of the invention will appear more fully from the following description.

MODE FOR CARRYING OUT THE INVENTION

An embodiment of the present invention is an inverter surge-resistant insulated wire, having at least one enamel baked layer around the outer periphery of a conductor, and at least one extrusion-coated resin layer on the outer side thereof, and having an adhesive layer between the enamel baked layer and the extrusion-coated resin layer, thereby the wire is reinforced in adhesive force between the enamel baked layer and the extrusion-coated resin layer, with the adhesive layer as a medium, wherein the sum of the thickness of the enamel baked layer, the extrusion-coated resin layer, and the adhesive layer is 60 µm or more, wherein the thickness of the enamel baked layer is 50 µm or less, and wherein the extrusion-coated resin layer is formed from a PPS resin composition, which contains a PPS polymer having a melt viscosity at 300° C. of 100 Pa·s or more, 2 to 8 mass % of a thermoplastic elastomer, and an antioxidant, and which has a tensile modulus of elasticity at 25° C. of 2,500 MPa or more and a tensile modulus of elasticity at 250° C. of 10 MPa or more. The insulated wire of the present invention is favorable for a heat-resistant wiring, which can be used, for example, for coils for electrical equipments, such as inverter-related equipments, high-speed switching devices, rotating electric motors driven by inverters, and transformers, or for magnet wires or the like, for electrical equipments for aerospace use, electrical equipments for aircraft, electrical equipments for nuclear power, electrical equipments for energy, and electrical equipments for automobiles.

(Conductor)

As the conductor that can be used in the present invention, use may be made of any conductor that has been conventionally used in insulated wires. The conductor that can be used in the present invention is a conductor of preferably a low-oxygen copper whose oxygen content is 30 ppm or less, and more preferably a low-oxygen copper whose oxygen content is 20 ppm or less or oxygen-free copper. When the conductor is melted by heat for the purpose of welding if the oxygen content is 30 ppm or less, voids caused by contained oxygen are not occurred at a welded portion, the deterioration of the electrical resistance of the welded portion can be prevented, and the strength of the welded portion can be secured.

Further, a conductor, which has a desired transverse cross-sectional shape, may be used, and it is preferable to use a conductor having a cross-sectional shape except for a circular shape, and particularly preferable to use a rectangular conductor. Furthermore, in terms of suppressing partial discharge from corners, it is preferable that chamfers (radius r) are formed at four corners.

The size of the conductor is not particularly limited, and, in the case of a rectangular conductor, the conductor preferably has a thickness of 0.1 to 3.0 mm and a width of 0.5 to 15 mm.

(Enamel Layer)

The enamel baked layer (hereinafter, also referred to as "enamel layer" simply) is formed, by applying a resin varnish onto a conductor several times, and baking the conductor. A method of applying the resin varnish may be a usual manner. For example, use may be made of a method using a die, which is utilized to apply varnish and has a shape similar to the shape of a conductor. When the conductor has a quadrangular cross-section, use may be made of a die called "universal die" that is formed in the shape of a curb. The conductor to which the resin varnish is applied is baked in a baking furnace also in a usual manner. Specific baking conditions depend on the shape of the furnace to be used. When using a natural convection-type vertical furnace with length approximately 5 m, baking may be achieved by setting a passage time period of 10 to 90 sec at 400 to 500° C.

As the enamel resin that forms the enamel layer, any of those conventionally utilized can be put to use, and examples include polyimide, polyamideimide, polyesterimide, polyetherimide, polyimide hydantoin-modified polyester, polyamide, formal, polyurethane, polyester, polyvinylformal, epoxy, and polyhydantoin. Preferred enamel resins are polyimide-based resins, such as polyimide, polyamideimide, polyesterimide, polyetherimide, and polyimide hydantoin-modified polyester, which are excellent in heat resistance.

Further, these may be used singly alone, or may be used as a mixture of two or more kinds thereof.

In order to reduce the number of passages made through the baking furnace and prevent the adhesive force between the conductor and the enamel layer from being extremely lowered, the thickness of the enamel layer is 50 μm or less, and preferably 40 μm or less. Further, in order to prevent deterioration of voltage resistance or heat resistance, which are properties required for the enameled wires as insulated wires, it is preferable that the enamel layer has a certain thickness. The lower limit of the thickness of the enamel layer is not particularly limited, as long as it is a thickness where no pinholes are formed. The lower limit thickness of the enamel layer is preferably 3 μm or more, and more preferably 6 μm or more.

One or a plurality of enamel layers may be formed.

(Extrusion-Coated Resin Layer)

In the present invention, the extrusion-coated resin layer is formed from a PPS resin composition, which contains a PPS polymer having a melt viscosity at 300° C. of 100 Pa·s or more, 2 to 8 mass % of a thermoplastic elastomer, and an antioxidant, and which has a tensile modulus of elasticity at 25° C. of 2,500 MPa or more and a tensile modulus of elasticity at 250° C. of 10 MPa or more.

In the present invention, it is preferable that the tensile modulus of elasticity of the PPS resin composition at 25° C. is 2,800 MPa or more. Further, it is preferable that the tensile modulus of elasticity of the PPS resin composition at 250° C. is 180 MPa or more.

Further, the tensile elongation at break at 25° C. of the PPS resin composition is preferably 15% or more, and more preferably 18% or more. Furthermore, the tensile elongation at break at 25° C. of the PPS resin composition after exposed to the air at 200° C. for 100 hours is preferably 5% or more, and more preferably 6% or more.

Herein, the tensile modulus of elasticity means a value that is measured using an ASTM No. 4 dumbbell, according to ASTM D-638.

Herein, the tensile elongation at break means a value that is measured using an ASTM No. 4 dumbbell, according to ASTM D-638.

The PPS polymer to be used in the present invention is a polymer having a resin structure which includes, as a repeating unit, a structure formed by an aromatic ring and a sulfur atom bonded together, and preferably, the PPS polymer is a resin having a structural moiety represented by the following structural formula (1) or (2) as a repeating unit.

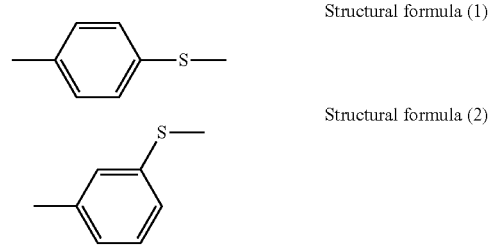

Examples include the structure in which a linkage is at the para-position as represented by structural formula (1), and the structure in which a linkage is at the meta-position as represented by structural formula (2), with a particular preference is given to the structure in which the linkage of the sulfur atom to the aromatic ring in the repeating unit is at the para-position as represented by structural formula (1), in view of heat resistance or crystallinity.

It is preferable that the melt viscosity of the PPS polymer, which is used in the present invention, at 300° C. is in the range of 100 Pa·s or more, since the toughness of the insulated wire, which prevents the insulated wire from being broken upon working, is remarkably improved. Furthermore, in terms of the favorable flowability of the PPS polymer in extruding, it is preferable that the melt viscosity of the PPS polymer is 2,000 Pa·s or less. Above all, in terms of performance balance, it is particularly preferable that the melt viscosity of the PPS polymer be in the range of 200 to 1,000 Pa·s.

Herein, the melt viscosity is a value that is measured by a capillary rheometer at 300° C., with shear speed 100 sec$^{-1}$, nozzle hole diameter 0.5 mm, and length 1.0 mm.

In a preferred embodiment of the present invention, the non-Newtonian index of the PPS polymer is preferably 1.1 or less, and more preferably 1.05 or less. If the non-Newtonian index exceeds 1.1, the tensile elongation at break at 200° C. for 100 hours is conspicuously lowered.

Herein, the non-Newtonian index is a value that is calculated from the slope of a logarithmic plot of the shear stress of the PPS polymer to a shear speed of 100 to 1000 (sec$^{-1}$), which is measured by using a die with diameter 1 mm and length 40 mm, under the condition of temperature 300° C., in a capillary rheometer.

The method of producing the PPS polymer is not particularly limited, but for example, the PPS polymer can be produced by the following methods 1 to 5.

Method 1: A method of polymerizing a poly-halogenated aromatic compound with sulfur in the presence of sodium carbonate.

A method of polymerizing a di-halogenated aromatic compound in a polar solvent in the presence of a sulfidating agent.

Method 2: A method of self-condensing p-chlorothiophenol.

Method 3: A method of: mixing N-methylpyrrolidone and a polyhalogenoaromatic compound, followed by heating, and adding thereto a hydrated sulfidating agent at a speed such that the amount of moisture in the reaction system would be within the range of 2 to 50 mol % of the organic polar solvent, thereby to cause reaction of the polyhalogenoaromatic compound and the sulfidating agent.

Method 4: A method of producing a PPS polymer, by cooling the gas phase portion of the reaction can during conducting the reaction of an alkali metal sulfide and a polyhalogenoaromatic compound in N-methylpyrrolidone, to thereby condense a part of the gas phase in the reaction can, and refluxing this condensed portion to the liquid phase, Method 5: A method of: mixing N-methylpyrrolidone, a non-hydrolyzable organic solvent, and a hydrated alkali metal sulfide, then dehydrating the resultant mixture liquid, to thereby produce a slurry containing a solid alkali metal sulfide, an alkali metal hydrosulfide (b), and an alkali metal salt of the hydrolysate of N-methylpyrrolidone (Process 1); and then causing reaction of a polyhalogenoaromatic compound with the alkali metal hydrosulfide, and the alkali metal salt of the hydrolysate of N-methylpyrrolidone, in the presence of the slurry, to conduct polymerization (Process 2).

Among these, the methods 3, 4, and 5 are particularly preferred, from the viewpoint that a linear, high molecular weight PPS polymer can be readily obtained.

The thermoplastic elastomer is preferably a polyolefin-based elastomer having a functional group, such as a hydroxyl group, a carboxyl group, an amino group, a mercapto group, an epoxy group, an acid anhydride group, an isocyanato group, an ester group, or a vinyl group, from the viewpoint of having excellent compatibility with the PPS polymer.

Among these, a particular preference is given to a polyolefin-based elastomer having a functional group derived from carboxylic acid, such as an acid anhydride, acid, or ester, or having an epoxy group.

The polyolefin-based elastomer can be obtained by, for example, copolymerizing an α-olefin and a vinyl polymerizable compound having the functional group mentioned above. Examples of the α-olefin include α-olefins having 2 to 8 carbon atoms, such as ethylene, propylene, and butene. Examples of the vinyl polymerizable compound having the functional group include α,β-unsaturated carboxylic acids and alkyl esters thereof, such as acrylic acid, methacrylic acid, acrylic acid esters, and methacrylic acid esters; α,β-unsaturated dicarboxylic acids and anhydrides thereof, such as maleic acid, fumaric acid, itaconic acid, other unsaturated dicarboxylic acids having 4 to 10 carbon atoms, mono- or di-esters thereof, and acid anhydrides thereof; and glycidyl (meth)acrylates.

Use can be made of a copolymer containing a plurality of these functional groups. Preferred examples thereof include terpolymers of an α-olefin, maleic anhydride, and glycidyl acrylate.

The thermoplastic elastomers containing these functional groups have favorable dispersibility with the PPS polymer, so that it becomes ready to obtain a uniformly mixed resin composition, and the working properties and the like of the insulated wire are improved.

The mixing proportion of such a thermoplastic elastomer is 2 to 8 mass % in the PPS resin composition, and when the mixing proportion is within this range, the PPS resin composition is excellently balanced between scratch resistance and workability. The mixing proportion of the thermoplastic elastomer is preferably 3 to 7 mass % in the PPS resin composition.

Further, the antioxidant to be used in the present invention is effective in preventing cracking of the resin coating layer after a heat treatment at 200° C. Preferred examples of the antioxidant include antioxidants of phenol-based (e.g. hindered phenols), amine-based (e.g. hindered amines), phosphorus-based, sulfur-based, hydroquinone-based, quinoline-based.

Examples of the phenol-based antioxidants include hindered phenols, for example, 2,2'-methylene-bis(4-methyl-6-t-butylphenol), 4,4'-methylene-bis(2,6-di-t-butylphenol), 4,4'-butylidene-bis(3-methyl-6-t-butylphenol), 2,6-di-t-butyl-p-cresol, 1,3,5-trimethyl-2,4,6-tris(3,5-di-t-butyl-4-hydroxybenzyl)benzene, 1,6-hexanediol-bis[3-(3,5-di-t-butyl-4-hydroxyphenyl) propionate], pentaerythritol tetrakis[3-(3,5-di-t-butyl-4-hydroxyphenyl) propionate], triethylene glycol-bis[3-(3-t-butyl-5-methyl-4-hydroxyphenyl) propionate], n-octadecyl-3-(4',5'-di-t-butylphenol) propionate, n-octadecyl-3-(4'-hydroxy-3',5'-di-t-butylphenol) propionate, stearyl-2-(3,5-di-t-butyl-4-hydroxyphenol) propionate, distearyl-3,5-di-t-butyl-4-hydroxybenzyl phosphonate, 2-t-butyl-6-(3-t-butyl-5-methyl-2-hydroxybenzyl)-4-methylphenyl acrylate, N,N'-hexamethylene-bis(3,5-di-t-butyl-4-hydroxy-hydrocinnamamide), 3,9-bis{2-[3-(3-t-butyl-4-hydroxy-5-methylphenyl)propionyloxy]-1,1-dimethylethyl}-2,4,8,10-tetraoxaspiro[5,5]undecane, 4,4'-thio-bis(3-methyl-6-t-butylphenol), and 1,1,3-tris(2-methyl-4-hydroxy-5-t-butylphenyl)butane.

Among the hindered phenols, a particular preference is given to, for example, $C_{2-10}$ alkylelnediol-bis[3-(3,5-di-branched $C_{3-6}$ alkyl-4-hydroxyphenyl) propionate], such as 1,6-hexanediol-bis[3-(3,5-di-t-butyl-4-hydroxyphenyl) propionate]; di- or tri-oxy-$C_{2-4}$ alkylenediol-bis[3-(3,5-di-branched $C_{3-6}$ alkyl-4-hydroxyphenyl) propionate], such as triethylene glycol-bis[3-(3-t-butyl-5-methyl-4-hydroxyphenyl) propionate]; $C_{3-8}$ alkylenetriol-bis[3-(3,5-di-branched $C_{3-6}$ alkyl-4-hydroxyphenyl) propionate], such as glycerin tris[3-(3,5-di-t-butyl-4-hydroxyphenyl) propionate]; and $C_{4-8}$ alkylenetetraol tetrakis[3-(3,5-di-branched $C_{3-6}$ alkyl-4-hydroxyphenyl) propionate], such as pentaerythritol tetrakis [3-(3,5-di-t-butyl-4-hydroxyphenyl) propionate].

Examples of the amine-based antioxidants include hindered amines, for example, tri- or tetra-$C_{1-3}$ alkylpiperidine or derivatives thereof [for example, 4-methoxy-2,2,6,6-tetramethylpiperidine, 4-benzoyloxy-2,2,6,6-tetramethylpiperidine, 4-phenoxy-2,2,6,6-tetramethylpiperidine]; bis(tri-, tetra- or penta-$C_{1-3}$ alkylpiperidine) $C_{2-20}$ alkylenedicarboxylic acid esters [for example, bis(2,2,6,6-tetramethyl-4-piperidyl) oxalate, bis(2,2,6,6-tetramethyl-4-piperidyl) malonate, bis(2,2,6,6-tetramethyl-4-piperidyl) adipate, bis(2,2,6,6-tetramethyl-4-piperidyl) sebacate, bis(1,2,2,6,6-pentamethyl-4-piperidiyl) sebacate, bis(2,2,6,6-tetramethyl-4-piperidyl) terephthalate], 1,2-bis(2,2,6,6-tetramethyl-4-piperidyloxy)ethane, phenyl-1-naphthylamine, phenyl-2-naphthylamine, N,N'-diphenyl-1,4-phenylenediamine, and N-phenyl-N'-cyclohexyl-1,4-phenylenediamine.

Examples of the phosphorus-based stabilizers include triisodecyl phosphite, trisnonylphenyl phosphite, diphenylisodecyl phosphite, phenyldiisodecyl phosphite, 2,2-methylene-bis(4,6-di-t-butylphenyl)octyl phosphite, 4,4'-butylidene-bis(3-methyl-6-t-butylphenyl)ditridecyl phosphite, tris (branched $C_{3-6}$ alkylphenyl) phosphite [for example, tris(2,4-di-t-butylphenyl) phosphite, tris(2-t-butyl-4-methylphenyl) phosphite, tris(2,4-di-t-amyl phenyl) phosphite, tris(2-t-butylphenyl) phosphite, tris[2-(1,1-dimethylpropyl)-phenyl] phosphite, and tris[2,4-(1,1-dimethylpropyl)-phenyl]phosphite]; bis(2-t-butylphenyl)phenyl phosphite, tris(2-cyclohexylphenyl) phosphite, tris(2-t-butyl-4-phenylphenyl) phosphite, bis($C_{3-9}$ alkylaryl)pentaerythritol diphosphite [for example, bis(2,4-di-t-butyl-4-methylphenyl)pentaerythritol diphosphite, bis(2,6-di-t-butyl-4-methylphenyl)pentaerythritol diphosphite, bis(nonylphenyl)pentaerythritol diphosphite, and bis(nonylphenyl)pentaerythritol diphosphite]; triphenyl phosphate-based stabilizers (for example, 4-phenoxy-9-α-(4-hydroxyphenyl)-p-cumenyloxy-3,5,8,10-tetraoxa-4,9-diphosphaspiro[5,5]undecane, and tris(2,4-di-t-butylphenyl) phosphate); and diphosphonite-based stabilizers (for example, tetrakis(2,4-di-t-butyl)-4,4'-biphenylene diphosphonite). The phosphorus-based stabilizers generally have a branched $C_{3-6}$ alkylphenyl group (particularly, a t-butylphenyl group).

Examples of the hydroquinone-based antioxidants include 2,5-di-t-butylhydroquinone; and examples of the quinoline-based antioxidants include 6-ethoxy-2,2,4-trimethyl-1,2-dihydroquinoline, and examples of the sulfur-based antioxidants include dilauryl thiodipropionate, and distearyl thiodipropionate.

These antioxidants may be used singly, or two or more thereof may be used in combination. From the fact that an effect of suppressing the lowering of the tensile elongation at break at 200° C. for 100 hours is remarkable, the amount of the antioxidant to be blended in the PPS resin composition according to the present invention is preferably 0.05 to 2 mass %, and more preferably 0.1 to 1 mass %.

The thickness of the extrusion-coated resin layer can be set at a thickness corresponding to a required partial discharge-occurring voltage, and is preferably 10 μm or more, more preferably 20 μm or more. The upper limit of the thickness of the extrusion-coated resin layer is not particularly limited, and is preferably 200 μm or less, more particularly 160 μm or less. Further, one or a plurality of extrusion-coated resin layers may be formed.

Further, the insulated wire of the present invention is a wire, which has an adhesive layer provided between the enamel baked layer and the extrusion-coated resin layer, and which is reinforced in the adhesive force between the enamel baked layer and the extrusion-coated resin layer, with the adhesive layer as a medium.

Further, the insulated wire of the present invention can be produced, for example, by baking a varnished thermoplastic resin, around the outer periphery of the enamel baked layer, to form the adhesive layer; and then, in the extrusion-coating step, bringing the adhesive layer into contact with the extrusion-coated resin, which is melted at a temperature higher than the glass transition temperature of a resin of the adhesive layer, thereby to cause thermal fusion of those.

When the adhesive force between the extrusion-coated resin layer and the enamel baked layer is not sufficient, wrinkles of the extrusion-coated resin layer may occur in some cases, on the inner portion of an arc of the wire bent, under a severe working condition, for example, when the wire is bent at a small radius. When the wrinkles occur, a space occurs between the enamel layer and the extrusion-coated resin layer, which may result in a phenomenon of lowering of a partial discharge-occurring voltage in some cases.

In order to prevent the lowering of the partial discharge-occurring voltage, it is necessary to prevent the wrinkles from being occurred on the inner part of the arc of the wire bent.

Then, such an occurrence of the wrinkles can be prevented, by introducing a layer, which has an adhesive function, between the enamel layer and the extrusion-coated resin layer, to increase the adhesive force.

In the adhesive layer, use may be made of any resin that is capable of being thermally fused, and, preferably, it is preferable to use a non-crystalline resin which is readily dissolved in a solvent, since the resin is used after made into a varnish. Further, in order to avoid deterioration of the heat resistance required of the insulated wire, the resin is preferably one excellent in heat resistance. Taking those into consideration, preferable examples of the resin include a polysulfone (PSU), a polyethersulfone (PES), a polyetherimide (PEI), a polyphenylsulfone (PPSU), a polyamideimide (PAI), a polyimide (PI), and an epoxy resin; and PES and PPSU are more preferable.

Further, any solvent may be used as the solvent used for varnishing, as long as the solvent can dissolve the selected resin. In order to improve the adhesiveness with the enamel layer that serves as an under layer when the enamel layer is baked, the solvent for varnishing is preferably the same as a solvent which is used when the enamel layer serving as the under layer is baked.

Further, the thickness of the adhesive layer is preferably from 2 to 20 μm, and more preferably from 5 to 10 μm. In order to thermally fuse the adhesive layer with the extrusion-coated resin layer sufficiently, the resin temperature in the extrusion-coating step needs to be equal to or higher than Tg (glass-transition temperature) of a resin selected for the adhesive layer, and is preferably a temperature higher than Tg by 30° C. or more, more preferably a temperature higher than Tg by 50° C. or more.

In the insulated wire of the present invention, the sum of the thickness of the enamel baked layer, the extrusion-coated resin layer, and the adhesive layer (adhesive agent layer) is 60 μm or more, and preferably from 70 to 200 μm.

Another embodiment of the present invention provides a method of producing a rotary electric machine, comprising the steps of: assembling an armature of a rotary electric machine, accompanied by deformation working of the insulated wire of the present invention in a state where the PPS resin composition of the extrusion-coated resin layer is not crystallized; and heating the assembled insulated wire, to a temperature of 120° C. or higher, to cause crystallization of the PPS resin composition of the insulated wire. Accordingly, it is possible to reduce the stress applied to the insulation coating of the wire upon forming the wire, and to improve thermal, mechanical, and chemical performances of the coating by crystallizing the PPS resin composition after assembling. Further, the deforming of the wire may be conducted in a usual manner.

(Degree of Crystallization of PPS Resin Composition)

Since the PPS polymer is a crystalline polymer, when the crystallization is insufficient, heat generation due to recrystallization is observed in the vicinity of 120° C. in the case where the temperature of a sample is raised by a DSC (differential scanning calorimeter) method. When the crystallization undergoes sufficiently, no heat generation due to recrystallization is observed.

(Method of Evaluating Degree of Crystallization)

The degree of crystallization of the PPS resin composition is defined by the following expression, based on DSC measurement.

$$(\text{Degree of crystallization})=(1-CT/MP)\times 100(\%)$$

CT: An amount (J/g) of heat generated by recrystallization, in the DSC measurement MP: An amount (J/g) of heat absorbed by melting, in the DSC measurement The DSC measurement somehow depends on the surrounding atmosphere and the speed of temperature raising, and, in the present invention, the temperature was raised at a speed of 20° C./min from 40° C. to 330° C., under a nitrogen atmosphere.

(Preferable Degree of Crystallization)

The wire-working in the method of producing a motor according to the present invention, is conducted in a state where the PPS resin composition is not crystallized. Herein, in the present invention, the state of not being crystallized means a state where the degree of crystallization is 85% or less, and, in this case, it is possible to reduce a stress applied in the wire-working since the toughness of the PPS resin composition is improved. This acts in a direction advantageous to the coating shape maintainability, which is a technical problem to solve according to the present invention, thereby to exhibit an effect of preventing the worked insulation coating from being broken. Further, preferably, by maintaining the degree of crystallization at 40% or more, it is possible to prevent the PPS resin from becoming too soft or flexible, which acts in a direction advantageous to the insulation performance maintainability, which is another technical problem to solve according to the present invention. That is, it is possible to prevent compression marks from occurring on the coating upon bending where a front jig is used as a fulcrum, thereby to exhibit an effect of preventing the thickness of the insulation layer from being locally decreased.

Further, the degree of crystallization of the PPS resin composition can be improved, by applying a temperature, which is equal to or higher than the recrystallization temperature, to the wire after working. When the PPS resin is crystallized, the mechanical, thermal, and chemical strength of the coating is enhanced, to improve the durability of the resultant product. As a preferable temperature for recrystallization, mention may be made of 120° C. or more, and more preferably 150° C. or more. The degree of crystallization after the crystallization is preferably 90% or more, more preferably 95% or more.

EXAMPLES

The present invention will be described in more detail based on examples given below, but the invention is not meant to be limited by these.

Synthesis of PPS Polymer

Preparation Example 1

First, a hydrated sulfidating agent was produced, by mixing the following materials.
(1) Flake-shaped hydrated sodium sulfide (manufactured by Nagao): 1.5 kg
Purity/Na$_2$S (58.9 mass %), NaSH (1.3 mass %)
(2) Flake-shaped hydrated sodium hydrosulfide (manufactured by Nagao): 0.225 kg
Purity/NaSH (71.2 mass %), Na$_2$S (2.7 mass %)
(3) Water 0.425 kg As such, the above three kinds of materials were mixed, to give 2.15 kg of a hydrated sulfidating agent.

Then, para-dichlorobenzene (1.838 kg), N-methylpyrrolidone (4.958 kg) and water (0.09 kg) were placed into a reaction tank equipped with a temperature sensor, a cooler, a dropping tank, an effluent separating tank, and a stirring blade, followed by heating the resultant mixture to 100° C., while stirring under a nitrogen atmosphere. Then, after the reaction tank was sealed, the hydrated sulfidating agent (2.15 kg) was added, dropwise, thereto, at 220° C., under an internal pressure of 0.22 MPa.

Dehydration was carried out in the reaction dropping, to carry out the reaction, by controlling so that the amount of water in the system would be 0.02 to 0.5 moles per mole of N-methylpyrrolidone, by returning para-dichlorobenzene that was discharged out together, to the reaction tank, and discharging water out of the system. The reaction was carried out until the temperature reached 240° C. by heating, and then the reaction system was maintained at 240° C. for one hour. Thus, the reaction was completed.

At the time of completion of the reaction, it was possible to confirm that the proportion of water was 0.17 mol % of the polar solvent (N-methylpyrrolidone). It was confirmed that the content of water was in the range of 0.02 to 0.5 moles per mole of the polar solvent in the course of the reaction of the polymer and even at the completion of the reaction.

The reaction product was washed with water, and dried, in a usual manner, to obtain a white powder of a polymer. This polymer is designated as "PPS-1". The PPS-1 had a melt viscosity at 300° C. of 300 Pa·s, and a non-Newtonian index of 1.05.

Preparation Example 2

The preparation was conducted in the same manner as in Preparation Example 1, except that (1) the amount of the flake-shaped hydrated sodium sulfide was changed to 1.6 kg, and that (2) the amount of the flake-shaped hydrated sodium hydrosulfide was changed to 0.185 kg, to obtain a PPS polymer, PPS-2, having a melt viscosity at 300° C. of 80 Pa·s, and a non-Newtonian index of 1.02.

Preparation Example 3

The PPS-2 as obtained in Preparation Example 2 was heated at 220° C. for 48 hours, under the atmosphere in the air, to obtain a PPS polymer, PPS-3, having a melt viscosity at 300° C. of 1,000 Pa·s, and a non-Newtonian index of 1.18.

(Preparation of PPS Resin Compositions)

The materials shown in Table 1 were uniformly mixed in each mass percentage in Table 1, followed by kneading and extruding at a temperature of 290 to 330° C. with a twin-screw extruder of 35 mmφ, to obtain PPS resin compositions "A-1" to "A-5" and "B-1" to "B-4", respectively.

TABLE 1

|  | A-1 | A-2 | A-3 | A-4 | A-5 | B-1 | B-2 | B-3 | B-4 |
|---|---|---|---|---|---|---|---|---|---|
| PPS-1 | 94.5 | 97 | 92 |  |  |  | 98.5 | 89.5 | 95 |
| PPS-2 |  |  |  | 56.7 |  | 94.5 |  |  |  |
| PPS-3 |  |  |  | 37.8 | 94.5 |  |  |  |  |
| ELA | 5 | 2.5 | 7.5 | 5 | 5 | 5 | 1 | 10 | 5 |
| ANTOXD | 0.5 | 0.5 | 0.5 | 0.5 | 0.5 | 0.5 | 0.5 | 0.5 | 0 |

Abbreviations of the first left column of Table 1 represent the following materials.

PPS-1 to PPS-3: The PPS-1 to PPS-3 as produced in the Preparation Examples 1 to 3

ELA: Maleic anhydride-modified ethylene/propylene copolymer (trade name: "TAFMER MH-7020", manufactured by Mitsui Chemicals, Inc.)

ANTOXD: Phenol-based antioxidant (trade name: "IRGANOX 1010", manufactured by Ciba Specialty Chemicals, Inc.)

Example 1

A rectangular conductor (copper of oxygen content 15 ppm) was provided, which had a dimension of 1.85 mm×2.48 mm (thickness×width) and a chamfer radius r of 0.5 mm at four corners. In forming an enamel layer, the conductor was coated with a polyamideimide resin varnish (trade name: HI406, manufactured by Hitachi Chemical Co., Ltd.), by using an enamel die with a shape similar to the cross-sectional shape of the conductor, followed by passing through a baking furnace with length 8 m set to 450° C., at a speed so that the baking time period would be 15 sec, thereby to form an enamel of thickness 5 μm, via this one step of baking. This step was repeated eight times, to form an enamel layer with thickness 40 μm, thereby to obtain an enameled wire with coating thickness 40 μm. Then, the enameled wire was coated with a resin varnish, obtained by dissolving a polyphenylsulfone resin (PPSU) (Solvay Advanced Polymer: Radel RS800) in N-methyl-2-pyrrolidone (NMP) to make into a 20-wt % solution, by using a die with a shape similar to the shape of the conductor, followed by passing through a baking furnace with length 8 m set to 450° C., at a speed so that the baking time period would be 15 sec, which baking was repeated two times, to form an adhesive layer with thickness 5 μm (the thickness formed via this one step of baking was 2.5 μm).

The thus-obtained enameled wire provided with the adhesive layer was provided as a core wire, followed by extrusion-coating so that the thickness of the PPS resin A-1 shown in Table 1 would be 115 μm and that the sum of the thickness of the adhesive layer and the PPS layer would be 120 μm, by using an extrusion die with a shape similar to the cross-sectional shape of the enameled core wire, thereby to produce an insulated wire. The screw of the extruder utilized had a full flight of 30 mm, L/D of 20, and a compression ratio of 3. Extrusion temperature conditions were set as shown in Table 2. Further, water cooling was performed after extrusion, and the degree of crystallization of the PPS resin composition was 40%.

TABLE 2

| Cylinder 1 | Cylinder 2 | Cylinder 3 | Head | Die |
| --- | --- | --- | --- | --- |
| 260° C. | 290° C. | 300° C. | 310° C. | 320° C. |

Examples 2 to 5 and Comparative Examples 1 to 4

In the same manner as in Example 1, insulated wires of Examples 2 to 5 were produced, using the PPS resin compositions A-2 to A-5, respectively, and insulated wires of Comparative Examples 1 to 4 were produced, using the PPS resin compositions B-1 to B-4, respectively.

The properties of the PPS resin compositions and the PPS polymers of the wires of Examples and Comparative Examples, were measured by the following methods.

(Tensile Modulus of Elasticity)

The tensile elongation at break was measured, using an ASTM No. 4 dumbbell, according to ASTM D-638.

(Melt Viscosity at 300° C.)

The melt viscosity was measured, using a capillary rheometer (trade name: CFT-500D, manufactured by Shimadzu Corporation), at 300° C., at shear speed 100 $sec^{-1}$, with nozzle hole diameter 0.5 mm and length 1.0 mm.

(Tensile Elongation at Break at 25° C.)

The tensile elongation at break was measured, using an ASTM No. 4 dumbbell, according to ASTM D-638.

(Tensile Elongation at Break after Thermal Aging)

The tensile elongation at break was measured, according to ASTM D-638, after an ASTM No. 4 dumbbell was exposed in a hot-air circulating-type dryer at 200° C. for 100 hours.

The following evaluation tests were conducted with respect to the wires of Examples and Comparative Examples. The results are shown in Table 3, together with the properties of the PPS resin compositions.

(Partial Discharge-Occurring Voltage)

The partial discharge-occurring voltage was measured, using a partial discharge tester "KPD1050", manufactured by Kikusui Electronics Corp. Two pieces of the respective insulated wire with a rectangular cross-section were brought into close contact with each other with plane contact at the planes of the long sides without any space therebetween over a length of 150 mm, thereby to produce a sample. An electrode was provided between the two conductors and connected to the conductors. Then, while an AC voltage of 50 Hz was applied, at a temperature 25° C., the voltage was continuously raised up, and an effective value of voltage was read at which a partial discharge of 10 pC occurred.

(Abrasion Resistance (25° C.))

The abrasion resistance was measured at four corners of the rectangular wire, in the same manner as "9. Abrasion resistance (round wire)" stipulated in JIS C 3003 "the method of testing enameled wires". A wire which had resistance to abrasion in terms of applied load of 2,000 g or more was judged to pass the test.

(Solvent Resistance)

With respect to the testing and evaluation of solvent resistance, the wire wound according to "7. Flexibility" stipulated in JIS C 3003 "the method of testing enameled wires", was immersed in a solvent for 10 sec, and the surface of the resultant enamel layer or extrusion-coated resin layer was observed with the naked eyes, to confirm whether cracks or crazing occurred or not. The testing was conducted with three kinds of solvents, that is, acetone, xylene, and styrene, respectively, and with two levels of temperature, that is, room temperature and 150° C. (in which, after the sample was heated at 150° C. for 30 min, the sample in the heated state was immersed in the solvent), respectively. A wire without false was judged to pass the test.

(Insulation Performance Maintainability at Worked Portion)

The respective magnet wire was bent by 90°, through the bending of the wire with a front jig as a fulcrum, thereby to give a respective test specimen. Then, according to "6.c) Pinhole method" stipulated in JIS C 3003 "the method of testing enameled wires", the thus-worked portion was immersed in 0.2% saline into which an appropriate amount of a 3% alcohol solution of phenolphthalein was added dropwise, followed by applying a DC voltage of 12 V for one minute, with the solution as a positive electrode and the conductor of the test specimen as a negative electrode, and the number of pinholes occurred was measured. A test specimen having one or less pinhole was judged to pass the test. Furthermore, a dielectric breakdown voltage at the worked portion was measured, according to "10. Method of testing dielectric breakdown voltage" stipulated in JIS C 3003 "the method of testing enameled wires". A test specimen, which had a dielectric breakdown voltage equal to or higher than the standard value stipulated in the above JIS, was judged to pass the test.

(Coating Shape Maintainability at Worked Portion)

The respective magnet wire was bent by 90°, through the bending of the wire with a front jig as a fulcrum, thereby to give a respective test specimen. With respect to the respective test specimen, a thermal shock test was conducted with one cycle of: −40° C. for 20 min ⇄ 200° C. for 20 min, and then the coating was observed with the naked eyes, to confirm whether cracks on the coating occurred or not. A test specimen whose coating had no cracks occurred after the completion of the test, was judged to pass the test.

(Insulation Performance Maintainability after Thermal Aging)

The respective wire was exposed to the air atmosphere under 200° C. for 100 hours. Then, an electrically-conductive paste was applied to the entire periphery of the wire over 20 mm in the longitudinal direction of the wire. A voltage of 50 Hz was applied between the conductor and the electrically-conductive paste, and a breakdown voltage was measured. A wire of which the breakdown voltage was 70% or more of a breakdown voltage value before such an exposure was judged to pass the test.

annealing at 150° C. for one hour after the completion of the assembling, thereby to produce the motor Comparative Example 5

A motor was produced in the same manner as in Example 6, except that the annealing temperature after the completion of the assembling was changed to 110° C.

Comparative Example 6

A motor was produced in the same manner as in Example 6, except that the degree of crystallization of PPS was changed to 90%, by annealing, in advance, the wire which was produced in Example 1, at 150° C. for one hour.

With respect to the motors of Example 6 and Comparative Examples 5 and 6, evaluation tests were conducted by the following methods on: the degree of crystallization of the PPS resin composition before working, the coating shape maintainability at the worked portion, the degree of crystallization of the PPS resin composition after subjecting to annealing after the working, and the abrasion resistance of the wire after subjecting to annealing. The results are shown in Table 4.

(Degree of Crystallization of PPS Resin Composition, and Degree of Crystallization of PPS Resin Composition after Annealing after Working)

By using DSC-7, manufactured by PerkinElmer Co., Ltd., 5 mg of the respective PPS resin composition as a measure-

TABLE 3

| | | Ex. 1 | Ex. 2 | Ex. 3 | Ex. 4 | Ex. 5 | C.E. 1 | C.E. 2 | C.E. 3 | C.E. 4 |
|---|---|---|---|---|---|---|---|---|---|---|
| Thickness (μm) | Enamel layer | 40 | 40 | 40 | 40 | 40 | 40 | 40 | 40 | 40 |
| | Adhesive layer | 5 | 5 | 5 | 5 | 5 | 5 | 5 | 5 | 5 |
| | PPS layer | 115 | 115 | 115 | 115 | 115 | 115 | 115 | 115 | 115 |
| | Total | 160 | 160 | 160 | 160 | 160 | 160 | 160 | 160 | 160 |
| PPS Properties | Tensile modulus of elasticity (MPa) at 25° C. | 3,000 | 3,200 | 2,800 | 3,100 | 3,200 | 3,100 | 3,300 | 2,200 | 3,100 |
| | Tensile modulus of elasticity (MPa) at 250° C. | 200 | 210 | 180 | 190 | 210 | 210 | 220 | 160 | 190 |
| | Melt viscosity (Pa · s) of PPS polymer at 300° C. | 300 | 300 | 300 | 600 | 1000 | 80 | 300 | 300 | 300 |
| | Elastomer content (%) | 5 | 2.5 | 7.5 | 5 | 5 | 7.5 | 1 | 10 | 5 |
| | Antioxidant (%) | 0.5 | 0.5 | 0.5 | 0.5 | 0.5 | 0.5 | 0.5 | 0.5 | 0 |
| | Tensile elongation at break (%) at 25° C. | 19 | 16 | 42 | 24 | 27 | 14 | 12 | 65 | 24 |
| | Tensile elongation at break (%) at 25° C. after exposed at 200° C. for 100 hours | 7.9 | 6.2 | 9.4 | 11 | 4.7 | 2.4 | 3.5 | 12 | 2.8 |
| | Non-Newtonian index of PPS polymer | 1.05 | 1.05 | 1.05 | 1.08 | 1.18 | 1.02 | 1.05 | 1.05 | 1.05 |
| Wire Properties | Partial discharge-occurring voltage | OK | OK | OK | OK | OK | OK | OK | OK | OK |
| | Abrasion resistance | OK | OK | OK | OK | OK | OK | OK | OK | OK |
| | Solvent resistance | OK | OK | OK | OK | OK | OK | OK | OK | OK |
| | Insulation performance maintainability at worked portion | OK | OK | OK | OK | OK | OK | OK | NG | OK |
| | Coating shape maintainability at worked portion | OK | OK | OK | OK | OK | NG | NG | OK | OK |
| | Insulating property maintainability (%) after thermal aging | 81 | 77 | 85 | 88 | 70 | 40 | 50 | 90 | 45 |

Note:
"Ex." means Example according to the present invention;
"C.E." means Comparative Example Example 6

A motor was assembled, using the wire (degree of crystallization 40%) of Example 1, and the polyphenylene sulfide resin of the insulated wire was crystallized by heating for ment sample, was heated at 20° C./min from 40° C. to 330° C., under a nitrogen atmosphere, followed by measuring the amount of heat generated by recrystallization and the amount of heat absorbed by melting, thereby to evaluate the degree of crystallization.

(Coating Shape Maintainability at Worked Portion)

The respective magnet wire was bent by 90°, through the bending of the wire with a front jig as a fulcrum, thereby to give a respective test specimen. With respect to the respective test specimen, a thermal shock test was conducted with one cycle of: −40° C. for 20 min↔ 200° C. for 20 min, and then the coating was observed with the naked eyes, to confirm whether cracks on the coating occurred or not. A test specimen whose coating had no cracks occurred after the completion of the test, was judged to pass the test.

(Pencil Hardness of Wire after Annealing)

The pencil hardness of the magnet wire was measured, according to JIS-K 5600-5-4 "scratch hardness (pencil method)".

TABLE 4

|  | Example 6 | Comparative Example 5 | Comparative Example 6 |
|---|---|---|---|
| Cristallinity of PPS resin before working | 40 | 40 | 90 |
| Coating shape maintainability at worked portion | OK | OK | NG |
| Cristallinity of PPS resin after annealing after working | 90 | 40 | 100 |
| Pencil hardness at the coating surface | H | 2B | H |

As can be seen from Table 4, it is understood that the workability of the wire was improved, by assembling the wire with the PPS resin before working at a state having been not crystallized (degree of crystallization 40%), and that the hardness of the wire was increased, by annealing at 120° C. or more (150° C.) after working, thus the abrasion resistance of the wire was improved.

As can be seen from Table 3, the thickness of the respective insulation coating is the same as that in Patent Literature 7; as a result, satisfactory results are obtained on a partial-discharge start voltage. Furthermore, since the tensile modulus of elasticity at 25° C. and the tensile modulus of elasticity at 250° C. are also the same as those in Patent Literature 7, satisfactory results are also obtained on the abrasion resistance and the solvent resistance.

The advantageous effects exhibited by the present invention will be described below on: (i) the insulation performance maintainability at the worked portion; (ii) the coating shape maintainability at the worked portion; and (iii) the insulation performance maintainability after thermal aging, among excellent properties that the insulated wire have, provision of which is contemplated for by the present invention.

Examples 1 to 4 each contain a polyphenylene sulfide polymer whose melt viscosity at 300° C. is 100 Pa·s or more, 2 to 8 mass % of a thermoplastic elastomer, and an antioxidant; and each are within the ranges of 1) the tensile elongation at break at 25° C. is 15% or more, 2) the tensile elongation at break at 25° C., after exposed to the air at 200° C. for 100 hours, is 5% or more, and 3) the non-Newtonian index is 1.1 or less. As a result, satisfactory results are obtained on all of (i) the insulation performance maintainability at the worked portion, (ii) the coating shape maintainability at the worked portion, and (iii) the insulation performance maintainability after thermal aging, each of which the present invention is to solve. Please note that, in Example 5, since the non-Newtonian index is higher than 1.1 and the tensile elongation at break of Example 5 at 25° C., after being exposed to the air at 200° C. for 100 hours, is lower than 5%, Example 5 is slightly inferior in the insulation performance maintainability after thermal aging, as compared with that in Examples 1 to 4, but Example 5 is still within the range of the scope of the present invention.

In contrast, in Comparative Example 1, since the melt viscosity at 300° C. is lower than 100 Pa·s, a satisfactory result is not obtained on the coating shape maintainability at the worked portion; and further, since the tensile elongation at break at 25° C. is lower than 15%, and the tensile elongation at break at 25° C., after being exposed to the air at 200° C. for 100 hours, is lower than 5%, a satisfactory result is not obtained on the insulation performance maintainability after thermal aging.

Further, in Comparative Example 2, since the thermoplastic elastomer content is lower than 2%, a satisfactory result is not obtained on the coating shape maintainability at the worked portion; and since the tensile elongation at break at 25° C. is lower than 15%, and the tensile elongation at break at 25° C., after being exposed to the air at 200° C. for 100 hours, is lower than 5%, a satisfactory result is not also obtained on the insulation performance maintainability after thermal aging.

Further, in Comparative Example 3, since the thermoplastic elastomer content is higher than 8%, a satisfactory result is not obtained on the insulation performance maintainability at the worked portion.

Further, in Comparative Example 4, since no antioxidant is added, and the tensile elongation at break at 25° C., after being exposed to the air at 200° C. for 100 hours, is lower than 5%, a satisfactory result is not obtained on the insulation performance maintainability after thermal aging.

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119 (a) on Patent Application No. 2008-220513 filed in Japan on Aug. 28, 2008, which is entirely herein incorporated by reference.

The invention claimed is:

1. An inverter surge-resistant insulated wire, having at least one enamel baked layer around the outer periphery of a conductor, and at least one extrusion-coated resin layer on the outer side thereof, and having an adhesive layer between the enamel baked layer and the extrusion-coated resin layer, thereby the wire is reinforced in adhesive force between the enamel baked layer and the extrusion-coated resin layer, with the adhesive layer as a medium, wherein the sum of the thickness of the enamel baked layer, the extrusion-coated resin layer, and the adhesive layer is 60 μm or more, wherein the thickness of the enamel baked layer is 50 μm or less, and wherein the extrusion-coated resin layer is formed from a polyphenylene sulfide resin composition, which contains a polyphenylene sulfide polymer having a melt viscosity at 300° C. of 100 Pa·s or more, 2 to 8 mass % of a thermoplastic elastomer, and an antioxidant, and which has a tensile modulus of elasticity at 25° C. of 2,500 MPa or more, and a tensile modulus of elasticity at 250° C. of 10 MPa or more.

2. The inverter surge-resistant insulated wire according to claim 1, wherein the polyphenylene sulfide polymer has a non-Newtonian index of 1.1 or less.

3. The inverter surge-resistant insulated wire according to claim 2, wherein the thermoplastic elastomer is a polyolefin-based elastomer comprising at least one functional group selected from the group consisting of a hydroxyl group, a carboxyl group, an amino group, a mercapto group, an epoxy group, an acid anhydride group, an isocyanato group, an ester group, and a vinyl group.

4. The inverter surge-resistant insulated wire according to claim 3, wherein the antioxidant is at least one antioxidant selected from the group consisting of a phenol-based antioxidant, an amine-based antioxidant, a phosphorus-based antioxidant, a sulfur-based antioxidant, a hydroquinone-based antioxidant, and a quinoline-based antioxidant.

5. The inverter surge-resistant insulated wire according to claim 2, wherein the antioxidant is at least one antioxidant selected from the group consisting of a phenol-based antioxidant, an amine-based antioxidant, a phosphorus-based antioxidant, a sulfur-based antioxidant, a hydroquinone-based antioxidant, and a quinoline-based antioxidant.

6. The inverter surge-resistant insulated wire according to claim 1, wherein the polyphenylene sulfide resin composition has a tensile elongation at break at 25° C. of 15% or more, and a tensile elongation at break at 25° C. after exposed to the air at 200° C. for 100 hours, of 5% or more.

7. The inverter surge-resistant insulated wire according to claim 6, wherein the polyphenylene sulfide polymer has a non-Newtonian index of 1.1 or less.

8. The inverter surge-resistant insulated wire according to claim 7, wherein the thermoplastic elastomer is a polyolefin-based elastomer comprising at least one functional group selected from the group consisting of a hydroxyl group, a carboxyl group, an amino group, a mercapto group, an epoxy group, an acid anhydride group, an isocyanato group, an ester group, and a vinyl group.

9. The inverter surge-resistant insulated wire according to claim 8, wherein the antioxidant is at least one antioxidant selected from the group consisting of a phenol-based antioxidant, an amine-based antioxidant, a phosphorus-based antioxidant, a sulfur-based antioxidant, a hydroquinone-based antioxidant, and a quinoline-based antioxidant.

10. The inverter surge-resistant insulated wire according to claim 7, wherein the antioxidant is at least one antioxidant selected from the group consisting of a phenol-based antioxidant, an amine-based antioxidant, a phosphorus-based antioxidant, a sulfur-based antioxidant, a hydroquinone-based antioxidant, and a quinoline-based antioxidant.

11. The inverter surge-resistant insulated wire according to claim 6, wherein the thermoplastic elastomer is a polyolefin-based elastomer comprising at least one functional group selected from the group consisting of a hydroxyl group, a carboxyl group, an amino group, a mercapto group, an epoxy group, an acid anhydride group, an isocyanato group, an ester group, and a vinyl group.

12. The inverter surge-resistant insulated wire according to claim 11, wherein the antioxidant is at least one antioxidant selected from the group consisting of a phenol-based antioxidant, an amine-based antioxidant, a phosphorus-based antioxidant, a sulfur-based antioxidant, a hydroquinone-based antioxidant, and a quinoline-based antioxidant.

13. The inverter surge-resistant insulated wire according to claim 6, wherein the antioxidant is at least one antioxidant selected from the group consisting of a phenol-based antioxidant, an amine-based antioxidant, a phosphorus-based antioxidant, a sulfur-based antioxidant, a hydroquinone-based antioxidant, and a quinoline-based antioxidant.

14. A method of producing a rotary electric machine, comprising the steps of:
assembling an armature of a rotary electric machine, accompanied by deformation working of the insulated wire of claim 1 in a state where the polyphenylene sulfide resin composition of the extrusion-coated resin layer is not crystallized; and
heating the assembled insulated wire, to a temperature of 120° C. or higher, to cause crystallization of the polyphenylene sulfide resin of the insulated wire.

15. The method of producing a rotary electric machine according to claim 14, wherein the thermoplastic elastomer is a polyolefin-based elastomer comprising at least one functional group selected from the group consisting of a hydroxyl group, a carboxyl group, an amino group, a mercapto group, an epoxy group, an acid anhydride group, an isocyanato group, an ester group, and a vinyl group.

16. The method of producing a rotary electric machine according to claim 14, wherein the antioxidant is at least one antioxidant selected from the group consisting of a phenol-based antioxidant, an amine-based antioxidant, a phosphorus-based antioxidant, a sulfur-based antioxidant, a hydroquinone-based antioxidant, and a quinoline-based antioxidant.

17. The method of producing a rotary electric machine according to claim 16, wherein the antioxidant is at least one antioxidant selected from the group consisting of a phenol-based antioxidant, an amine-based antioxidant, a phosphorus-based antioxidant, a sulfur-based antioxidant, a hydroquinone-based antioxidant, and a quinoline-based antioxidant.

18. The inverter surge-resistant insulated wire according to claim 1, wherein the thermoplastic elastomer is a polyolefin-based elastomer comprising at least one functional group selected from the group consisting of a hydroxyl group, a carboxyl group, an amino group, a mercapto group, an epoxy group, an acid anhydride group, an isocyanato group, an ester group, and a vinyl group.

19. The inverter surge-resistant insulated wire according to claim 18, wherein the antioxidant is at least one antioxidant selected from the group consisting of a phenol-based antioxidant, an amine-based antioxidant, a phosphorus-based antioxidant, a sulfur-based antioxidant, a hydroquinone-based antioxidant, and a quinoline-based antioxidant.

20. The inverter surge-resistant insulated wire according to claim 1, wherein the antioxidant is at least one antioxidant selected from the group consisting of a phenol-based antioxidant, an amine-based antioxidant, a phosphorus-based antioxidant, a sulfur-based antioxidant, a hydroquinone-based antioxidant, and a quinoline-based antioxidant.

* * * * *